July 28, 1953  R. E. FOGG  2,646,726
APPARATUS FOR TRIMMING AND NOTCHING SIGNATURES
Filed Jan. 12, 1950  5 Sheets-Sheet 1
FIG. I.  FIG. II.  FIG. III.  FIG. IV.
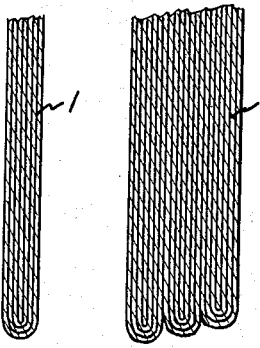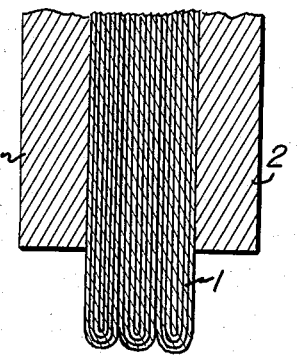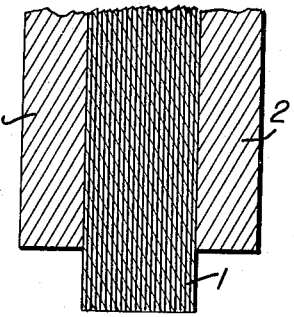
FIG. V.  FIG. VI.
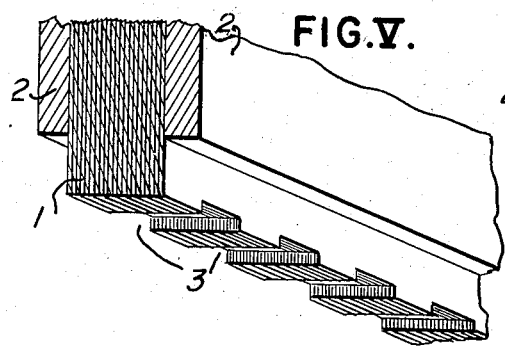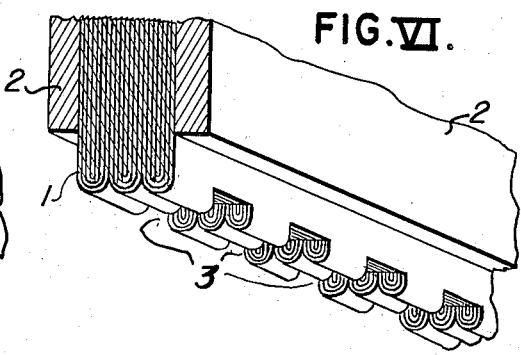
FIG. VII.
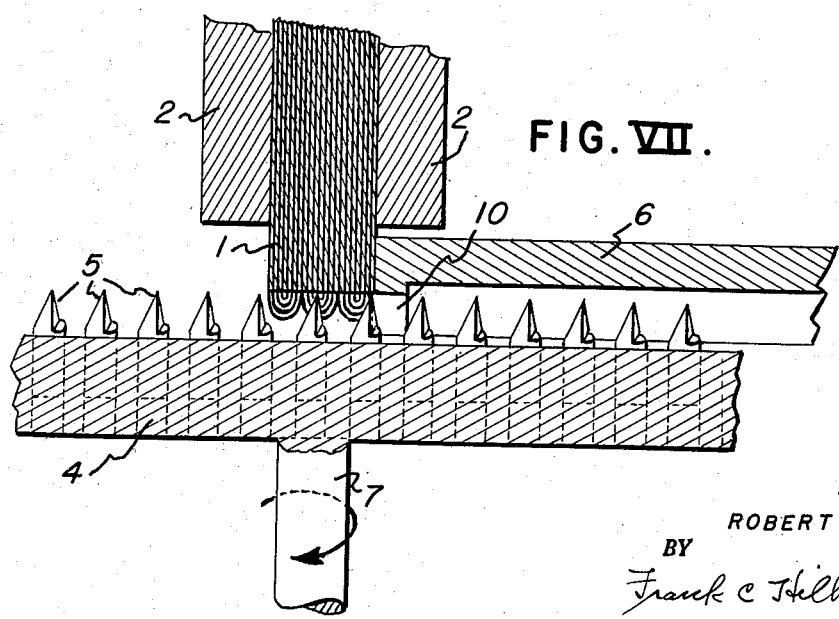
INVENTOR.
ROBERT E. FOGG
BY
Frank C Hilberg
ATTORNEY July 28, 1953 R. E. FOGG 2,646,726
APPARATUS FOR TRIMMING AND NOTCHING SIGNATURES
Filed Jan. 12, 1950 5 Sheets-Sheet 2
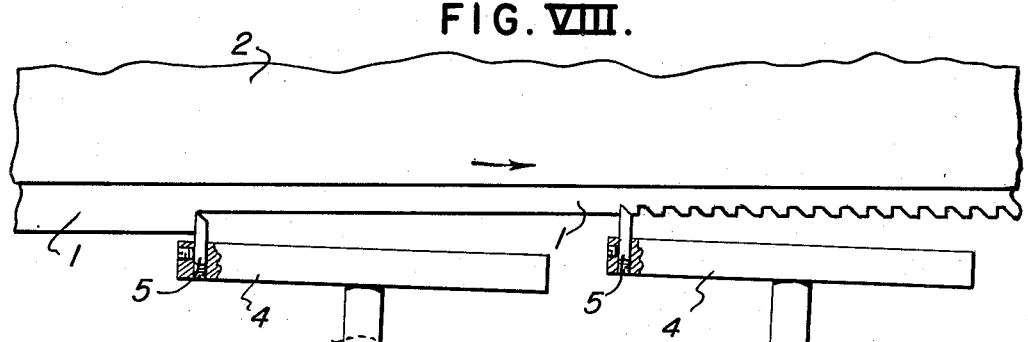
FIG. VIII.
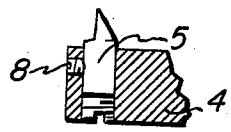
FIG. IX.
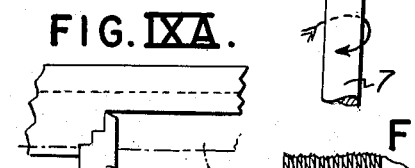
FIG. IXA.
FIG. IXB.
FIG. X.
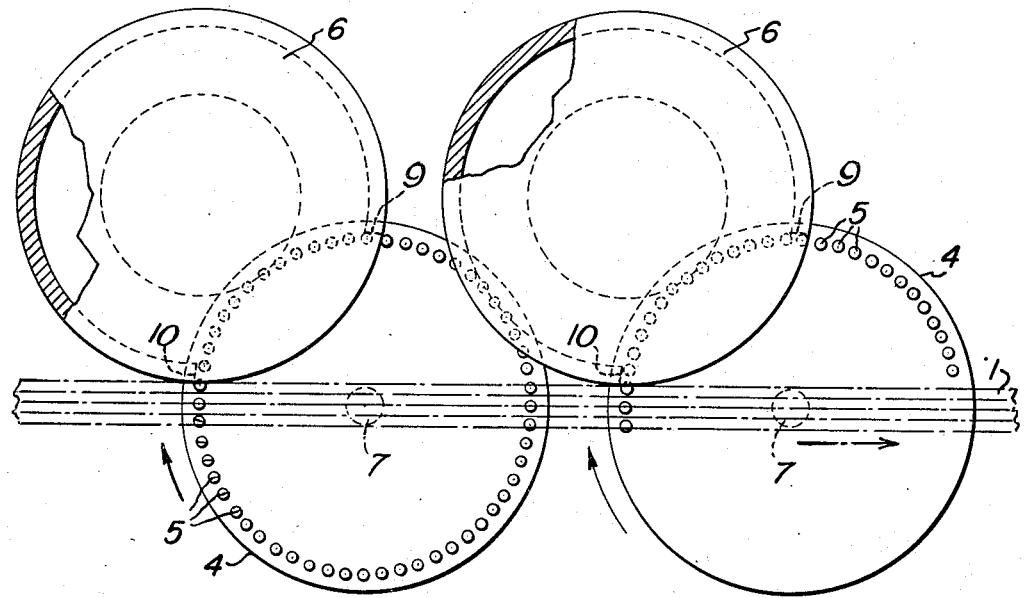
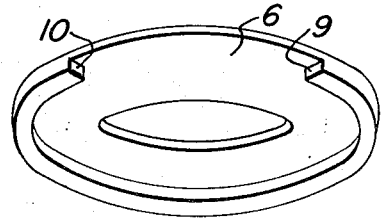
FIG. XI.
INVENTOR.
ROBERT E. FOGG
BY
Frank C. Hilberg
ATTORNEY July 28, 1953 R. E. FOGG 2,646,726
APPARATUS FOR TRIMMING AND NOTCHING SIGNATURES
Filed Jan. 12, 1950 5 Sheets-Sheet 3
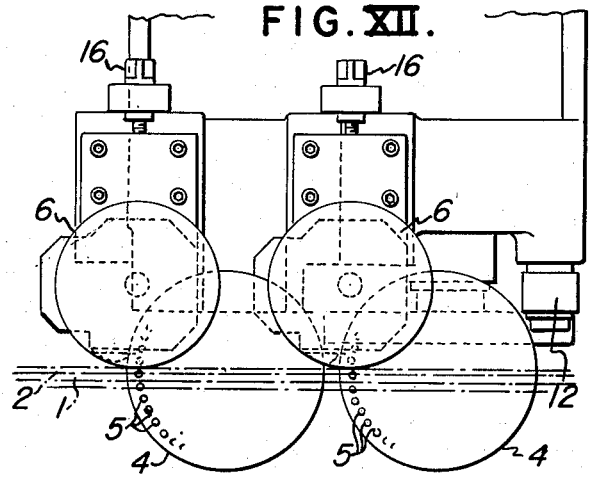
FIG. XII.
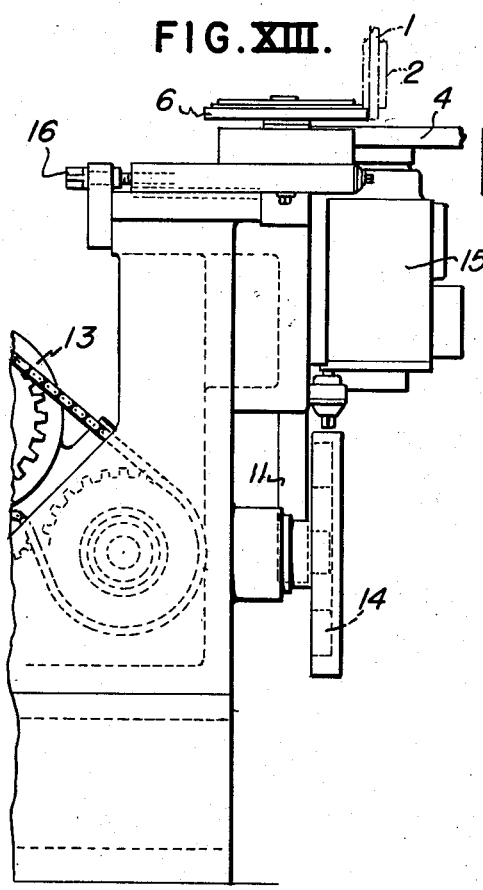
FIG. XIII.
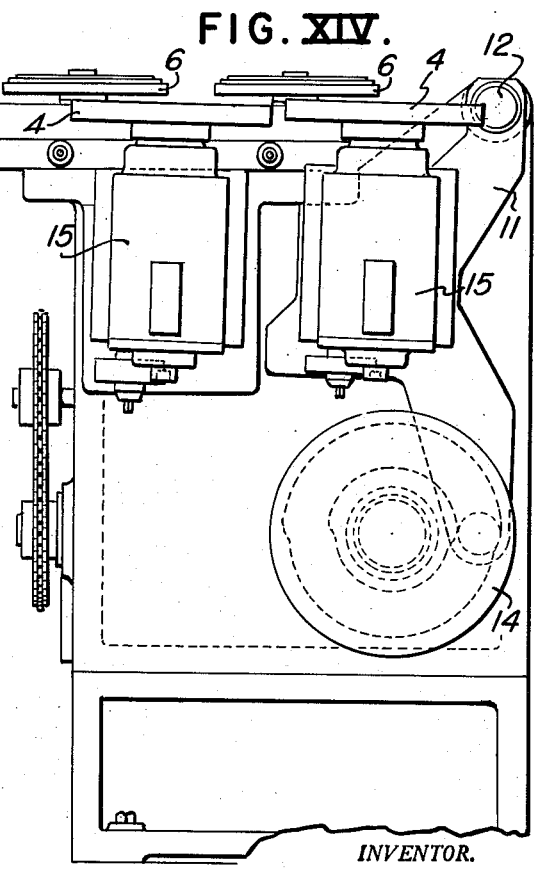
FIG. XIV.
FIG. XV.
PITCH = 1 REV. of CUTTER
INVENTOR.
ROBERT E. FOGG
BY
Frank C. Hilberg
ATTORNEY July 28, 1953  R. E. FOGG  2,646,726
APPARATUS FOR TRIMMING AND NOTCHING SIGNATURES
Filed Jan. 12, 1950  5 Sheets-Sheet 4
FIG. XVI.
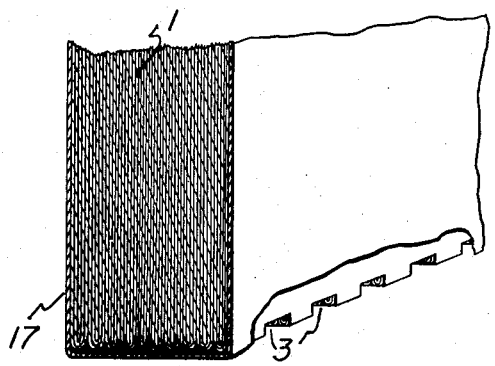
FIG. XVII.
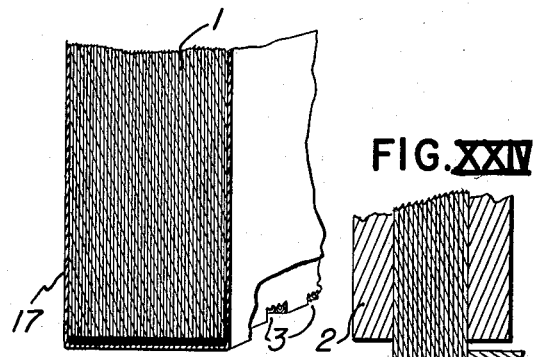
FIG. XVIII.
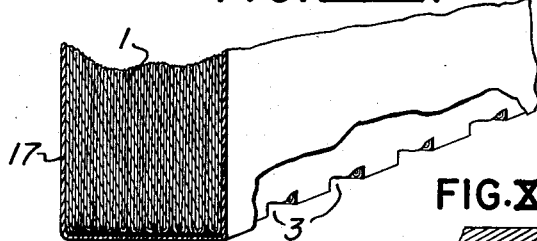
FIG. XIX.
FIG. XX
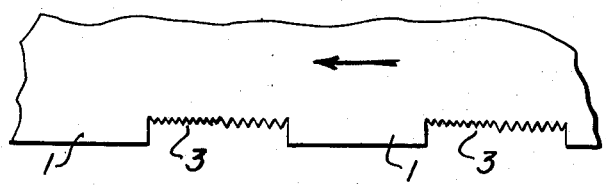
FIG. XXI.
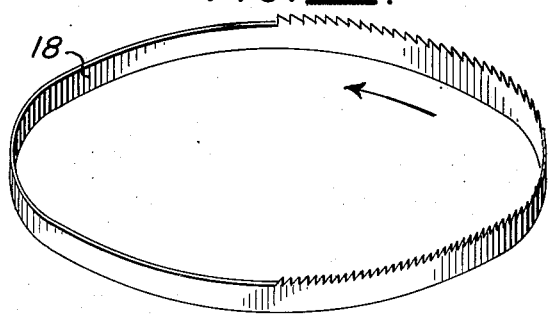
FIG. XXIV
FIG. XXIII.
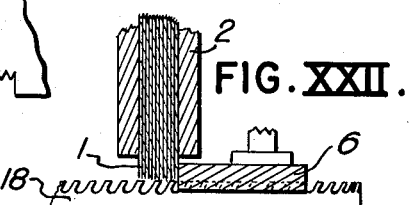
FIG. XXII.
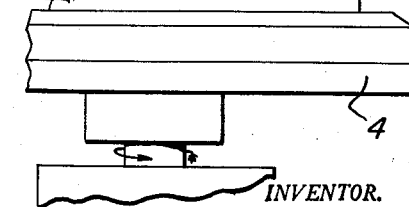
INVENTOR.
ROBERT E. FOGG
BY
Frank C. Hilberg
ATTORNEY

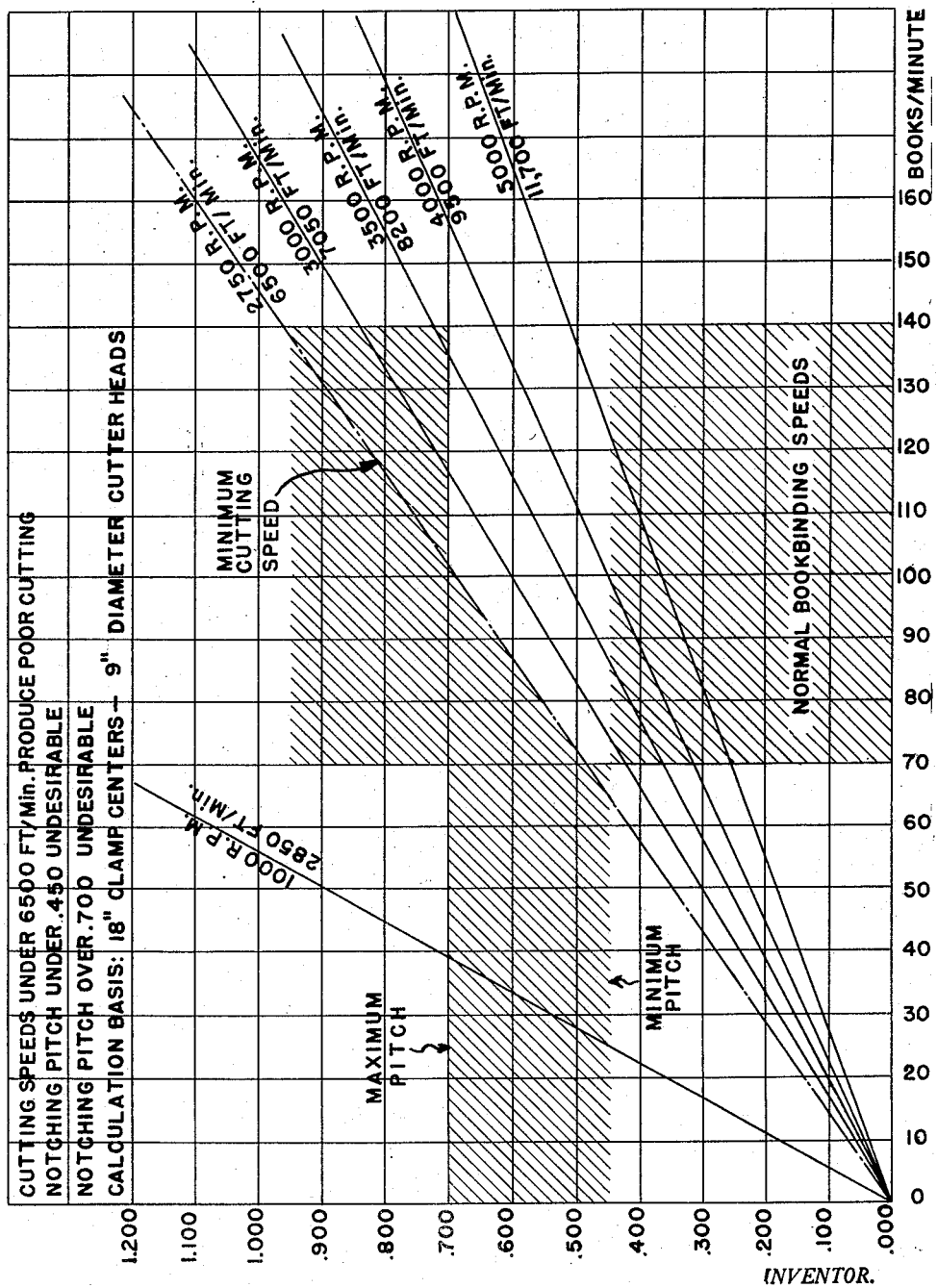

Patented July 28, 1953

2,646,726

UNITED STATES PATENT OFFICE 2,646,726

APPARATUS FOR TRIMMING AND NOTCHING SIGNATURES

Robert E. Fogg, Wilmington, Del., assignor to E. I. du Pont de Nemours & Company, Wilmington, Del., a corporation of Delaware Application January 12, 1950, Serial No. 138,169

12 Claims. (Cl. 90—14)

This invention relates to the art of binding books, magazines, catalogs and similar articles with hot melt adhesives and to a new apparatus for binding same, and adapted to be incorporated in the general arrangement shown in U. S. Patents Nos. 1,073,324; 1,248,252; 1,804,392; 1,867,803 and other patents relating to continuous commercial book binding apparatus. More particularly it relates to improvements in the preparation of the backbone of the book for better acceptance of the adhesive, and to a rotary cutting head and book-supporting back-up plate which provide the means of accurately pattern-roughing, notching and grooving of the backbone of the book to be adhesively bound.

The practice of increasing the glue-line at the backbone of the book, magazine or the like with or without previously trimming the signature folds has long been known to the art, but the early patented inventions are not in general commercial practice today. This apparently can be explained on the fact that mechanisms heretofore designed to accomplish the transverse grooving in early bookbinding operations are not adequate to operate at speeds as high as 150 books per minute currently necessary with modern bookbinding operations particularly operations where hot melt synthetic adhesives have replaced orthodox animal glues. The prior art groove cutters and orthodox back-up plates are such that a clean, sharply defined series of transverse grooves cannot be consistently obtained at high speeds. The pattern definition becomes increasingly ragged as the cutting teeth become dull from usage for even short periods. Such cutters generally require replacement or re-sharpening even for the simple operation of "roughing" the backs of about ten or twenty thousand volumes. Such cutters are not at all practical for commercial grooving purposes. Replacement involves non-productive shutdowns, thereby adding to the costs of binding.

It is an object of this invention to provide a means of pattern roughing and transverse grooving of the book backbone which will operate at the higher speeds of bookbinding machinery designed for application of hot melt adhesives. Another object is to provide a high speed rotary cutting mechanism for notching the uncut signature back folds of books, magazines and the like preparatory to binding with a hot melt adhesive. A further object is to provide a durable cutting head for pattern roughing and transverse grooving wherein the operative life is lengthened to a manifold degree in comparison with mechanisms tried heretofore.

Still another object is to provide a multi-toothed paper cutting mechanism wherein the individual durable teeth are adjustable to yield sharply defined patterns of preferred design. A still further object is to provide a durable, rotational cutting mechanism wherein the exposed portion of the gathered signatures subject to the impact of the cutting teeth is supported by an improved book back-up plate to yield sharpness of pattern and freedom from roughness and irregularities.

These objects are accomplished by means of a special cutting mechanism which consists of a substantially horizontally disposed rotatable disc provided with a number of replaceable cutters, mounted near the periphery of the disc and projecting vertically upward to form a series of cutting edges. This disc is preferably rotated about its spindle at a high speed, i. e. about 3500–4000 R. P. M. or more and is vertically adjustable to bear against the folded signatures as they pass over the cutting mechanism. A small portion of the signatures extend below the clamps so the cutting teeth clear the clamps. A supported back-up plate preferably circular is pressed against the exposed portion of the signatures below the clamps. This plate is provided with a flange having grooves of the same size and shape as the cutting teeth so that as the teeth pass transversely across the signatures through the grooves, they cut the paper to the desired shape on the punch and die principle. An alternative arrangement is to have an arc of the back plate flange cut out to form a shear bed and the teeth provided with a vertical shearing edge. The signatures are then cut by a shearing action as they pass between the teeth and shear bed formed by the flange. The apparatus for passing the signatures past the cutter may be of any conventional type such as shown in the patents mentioned above, particularly Alger 1,804,392. This patent shows a metallic belt or chain for transporting the clamped signatures.

These arrangements will be more apparent on reference to the drawing in which Figure I is a diagrammatic fragmentary sectional perspective view of a single folded signature. These signatures are usually handled in groups and for illustrative purposes, Figure II is a similar view showing a group of such signatures. Figure III is likewise a diagrammatic fragmentary sectional perspective view of a group of signatures held between clamps. Figure IV is a similar view in which the folded portion of the signature has been trimmed. Figure V is a fragmentary perspective of trimmed and grooved signatures held between the clamp. Figure VI is a similar view showing untrimmed signatures after they have passed by the second cutter (in which case the first cutter is not used). Figure VII is a fragmentary sectional elevation showing the arrangement of the cutting head, the signatures and the back plate.

Figure VIII is likewies a fragmentary sectional elevation showing the clamped signatures and the arrangement of the two cutting heads. Figure IX is a detailed section of a cutting tooth. Figure IXA is a side elevation showing a cutter having three cutting edges arranged on the same tooth in step fashion to facilitate heavy cuts. Figure IXB is a fragmentary section showing the contour of a cut made by the cutter 5 of Figure IXA. Figure X is a top plan view of the apparatus shown in Figure VIII indicating a full complement of uniformly spaced teeth disposed equidistant from the axis of rotation of a primary cutter disc near its periphery and fewer teeth disposed in an arced segment equidistant from the axis of rotation of a second cutter disc near its periphery, Figure XI is an underface perspective of the backing plate acts as a shear bed or a die. Figure XII is a detailed top plan view of the two cutting heads shown in Figure VIII.

Figures XIII and XIV are side and front elevations of the cutting heads showing means for reciprocating them. Figure XV is a diagrammatic view of the notches cut in a group of signatures when the book speed is 100 per minute and the cutter speed is 3600 R. P. M., the pitch being ½ inch. Figure XVI is a fragmentary sectional perspective of a book showing how the signatures are embedded in the adhesive. Figure XVII is a similar view showing the trimmed edges coated with the adhesive. Figure XVIII is likewise a fragmentary sectional perspective of a finished book with the cover broken away to show a different design of notch.

Figure XIX is a detailed sectional view of a tooth as it passes through the groove in the back plate. Figure XX is a fragmentary sectional elevation showing the type of notch which is cut when a group of teeth shown in perspective in Figure XXI is varied in coarseness, i. e. teeth per linear inch. Figure XXII represents the use of a cutting edge shown in Figure XXI in place of the teeth. This figure is a fragmentary sectional elevation and illustrates particularly how the stationary backing plate supports the signatures while the teeth are cutting the notches or trimming the signatures.

Figure XXIII is a similar view illustrating the prior art backing plate which does not support the signatures below the cutting teeth. Figure XXIV is a fragmentary section of a signature held between the clamps which are notched according to the prior art illustrated in Figure XXIII. It will be noted that the signatures fray out at the trailing edge leaving a rough cut.

Figure XXV is a graph showing areas of normal book binding speeds, minimum cutting speeds, and minimum and maximum pitches. In the graph, the number of books per minute, that is one book per 18 inch clamp, are plotted against the notching pitch. Practice has shown that precision cutting and notching is best obtained at the high book speeds of 70 to 140 books per minute and higher associated with binding of books with hot melt resinous adhesives only when the cutting speed is at the rate of at least 6500 feet per minute and the notching pitch is in the range of about .450 and .700. In the case of the particularly discosed 9 inch cutter head, a speed of 2750 R. P. M. is equivalent to 6500 feet per minute. Smaller diameter cutter heads must operate at higher R. P. M. values to obtain this minimum cutting speed. Speeds of 1000 R. P. M. such as associated with prior art operations is shown as a reference line to indicate unsatisfactory notching at currently used bookbinding speeds.

In all of the figures, 1 represents the folded signatures, 2 indicates the clamps which hold the signatures in place, while the notches are indicated as 3.

The folded edges of the signatures are trimmed by means of the revolving cutting head 4 which is provided with teeth 5. The signatures are supported by a backing plate 6, as they are trimmed or notched. The cutting head 4 is mounted on a revolving spindle 7 which is preferably individually motorized. The plate 6 is usually made from a soft machinable metal such as brass. The same figures illustrate corresponding parts in the second cutting head, although the teeth 5 may be of a different shape. The teeth 5 are mounted in the cutting head 4 and each individual tooth is advanced upwardly by a screw beneath the tooth, and each is held stationary by set screw 8 to prevent the twisting of the tooth. The backing plate 6 is provided with a removable and dispensible flange 9 which acts either as a shear bed or the die depending on whether the teeth cut against the edge 10 or pass through a hole in the flange 9 which acts as a die shown in Figure XIX.

In Figures XXII, XXIII and XXIV, the heads 4 are provided with a reciprocating means which consists essentially of a rocker arm 11, pivoted on shaft 12 and activated by motor 13 and cam or eccentric 14. The motor 15 which rotates the cutting head 4 is mounted on the rocker arm 11. The speed and shape of the eccentric 14 is such that the cutting head is depressed at the beginning and end of a book so that the notches will not be cut at these points. The backing plate 6 is adjustably rotatable by means of a vernier consisting essentially of a shaft 16 provided with a worm which in turn drives other compound gears not shown. The backing plate 6 is rotated so that the cutting face 10 is advanced about 1 or 2 thousandths of an inch and is kept sharp by the cutting teeth.

In Figures XVI to XVIII the cover of the book is designated as 17. In place of the teeth 5 of the cutting head a saw blade illustrated as 18 in Figure XXI may be substituted.

In operation the cutting and grooving mechanism of the present invention is incorporated in place of the trimmer or immediately after it in one of the production line machines shown in the patents mentioned above. In operation the signatures to be formed into a book are gathered and assembled between the clamps 2, by any known means. Ordinarily, these clamps are about 18 inches in length and travel along the production line of the machine at a constant speed corresponding approximately to 75 to 150 books per minute. The clamped signatures have about 5/16 of an inch exposed for subsequent operations preparatory to the application of an adhesive which binds the pages to each other and to the cover.

Generally the initial step after the signatures are assembled between the clamps is trimming to remove the folds leaving a group of single sheets between the clamps. The cutting in prior art practice is done with a rotating disc knife. The knife, being relatively thin, is subject to deflections during the operation and consequently the edge is not machined or squared off with a high degree of accuracy. This lack of precision gives rise to non-uniformity in adhesive thickness and often is the cause of faulty cover application. The cutting mechanism herein disclosed may replace or supplement the disc knife. In the latter case, the disc knife is retained as a preliminary trimming mechanism. The disc knife dulls rapidly and it is preferred, therefore, to avoid shutdowns by substituting the knife by the multitoothed cutting heads of the herein-described invention.

The folded signatures are trimmed by the disc knife, or by the primary cutting head shown in Figure VIII. The primary cutting head is a carefully balanced disc mounted on a suitable spindle which is substantially vertically disposed but tilted with respect to the travel of the book so that the trailing cutters are just below the edge of the trimmed signatures to avoid cutting at this point. The discs are preferably flat metal of about one inch thick and 10 inches in diameter although these dimensions may vary. The cutting teeth are usually made of cylindrical stock from 1/8 to 1/4 inch in diameter. The cutting edge is usually truncated, although the step shape shown in Figure IXA or other shape for special purposes is sometimes preferred.

On the opposite side of the signatures is a backing plate 6, which is likewise a disc provided with a brass flange around its circumference. The plate is mounted horizontally so that one point of its circumference bears against the travelling signature below the clamps. This back-up plate has a groove cut in the portion of the flange which extends below the plate itself, the cutting is usually done by the cutting teeth 5 and is accomplished by allowing them to cut the groove as the cutting head is fed upwardly against the brass flange. After the groove of the required depth is cut, the backing plate is maintained in a fixed position so that the rotating teeth pass through the groove, thereby cutting the signatures on the punch and die principle. It is to be understood that the peripheral speed of the discs 4 and consequently the cutting edges 5 is much greater than that usually associated with a punch and die.

The preferred form at present is to start in this manner, but as the groove becomes enlarged, to rotate the back plate by a vernier adjustment toward the teeth so they act as a shear and the plate as a shear bed, thereby cutting on the edge toward the advancing signature. The discs are normally operated at about 3450 R. P. M.

The flange 9 on the plate 6 is usually made of soft brass or an equivalent metal or material in which a groove can readily be cut by the cutting teeth 5. The cutting teeth may be made of any suitable material usually used for such purposes and in the preferred design, 72 carbide (grade K-6 Kennametal) is preferred. The teeth are preferably mounted in holes precisely indexed about the circumference of a circle, having a diameter of about 9 inches when using a disc of 10 inches in diameter. As mentioned above, each hole is threaded and recessed for a key. In the preferred embodiment the tooth is from 1/8 to 1/4 inch in diameter at the base, although these dimensions may vary with the type of work to be done. The teeth may be of any suitable design, although it has been found that one having a wedge shape of 60° and a recessed trailing edge of about 15° and a leading edge depressed by an angle of 5° for clearance is satisfactory. It will be apparent that other shaped teeth prepared from square or other polygon shank stock may be used.

In the preferred embodiment, back-up plate 6 is about 7 inches in diameter and has a removable and dispensible ring which increases it to about 8 3/8 inches. This ring is provided with a depending flange or rim edge, a cross-section of which is 3/8 inch square. The rim may be of any metal alloy or plastic which is readily machined, although Phosphor bronze is preferred. In operation the ring edge is tangentially in contact with one side of the signatures exposed below the clamps. The ring should be sufficiently thick to extend appreciably below the lower exposed edge of the signatures thereby giving them full support.

As shown in Figures VI and VIII, a similar cutting head and backing plate designated as a secondary cutting head is disposed immediately following the primary cutting head. Each of the heads are independently mounted and driven. The secondary cutter is similar to the primary cutting head, but is usually provided with teeth of varying heights. Usually from 12 to 60 and preferably from 25 to 45 of the potential total of 72 teeth are raised to cutting height. If the cutting teeth are in a single segment, one groove and one ridge per revolution is produced. Two grooves and two ridges are provided with two segments of cutting teeth. The back-up plate for the secondary cutter is mounted in the same manner as described above with respect to the primary cutting head.

In the bookbinding machinery the clamps holding the gathered signatures travel at a specific constant rate, as for example 100 books per minute or equivalently 1800 inches per minute, and the rotating cutting head has a motorized constant speed spindle which has for example a speed of 3450 R. P. M. Under these conditions, during one revolution of the cutting head, the book has advanced .522 inch and if there are 72 equi-spaced teeth, the pitch is .00725 inch. When all teeth are at the same height, the backbone signatures are cut clean without notches, grooves or pattern roughing. Under these conditions the cutting head operates as a trimming knife and may be used to even-off the backbone of the book with greater accuracy than with a rotating knife. When about 30 teeth are distributed consecutively as a segment of the cutting head disc, each rotation of the cutter causes cutting of the signature back-folds for one-half the distance of advancement of the book leaving the signature folds uncut for the remaining half. Such operation produces a backbone pattern of about 1/4 inch grooves separated by signature folds 1/4 inch in length. When the 30 teeth are distributed uniformly in two 15 teeth groups in opposing 90 degree segments, the pattern consists of about 1/8 inch grooves separated by uncut signature folds about 1/8 inch in length.

When about 15 teeth are mounted uniformly in a single 90 degree segment, a groove about ⅛ inch wide alternates with an uncut signature fold about ⅜ inch in width. The depth of the groove is regulated by adjustment of the height of the cutting teeth. It is obvious that the pattern may be altered by other spacings of the cutting teeth and by a change in the relative speeds of the cutting head and book travel. For example, when the cutter speed is 3450 R. P. M. and the book travel is reduced to 75 books per minute or equivalently 1350 inches per minute, the book advances only 0.392 inch for each revolution of the cutter and consequently the pattern is of finer degree, being repeated at least once for each 0.392 inch.

When the book speed is increased to 150 books per minute or 2700 inches, the alternation in pattern occurs at least once every 0.785 inch.

It is to be noted that with 72 uniformly spaced teeth, normally one would calculate that 36 teeth must be depressed to obtain a pattern of equal width grooves and ridges. However, inasmuch as the first tooth cuts a groove greater in width than the pitch, the number of cutting teeth is not one-half the total but rather about 40% of the total, that is, about 30 teeth of the 72 total.

The use of fewer than the total maximum of 72 equi-spaced teeth as indicated above is representative of pattern grooving of the book backbone. In designing the pattern, the cutting teeth are depressed in the base disc rather than actually being removed. This preserves the balance of the disc.

It will be readily apparent that pattern roughing may also be varied by having the cutting bits at a plurality of cutting levels. However, this is not a preferred means of varying the pattern because only the cutting bits at the highest cutting level have full benefit of the tooth-cut die of the back support. Cutting bits at lower levels have only partial support of the die and consequently the grooves are less precisely machined.

A further modification of the cutting mechanism provides that the pattern roughing cutting head be mounted on a floating motorized spindle in order that the cutting activities might be controlled reciprocally with the travel of the book. The object is to avoid cutting a groove at the ends of the backbone. Retention of full amount of backbone at these points improved the quality of cover application. Some of the smaller books and magazines are assembled as dual signatures and subsequently cut into two volumes if the book carriage is sufficiently in length to handle the dual signature. In such a set-up the eccentric or reciprocating control of the cutting head is designed to interrupt cutting not only at the two ends, but also at the middle of the double length backbone, the unpatterned middle section being about double the unpatterned end section.

The reciprocating pattern may be timed so that the first cutting head does the rough patterning of the backbone and the second cutting head superimposes fine patterning.

The second cutting head differs in that less than the maximum number of teeth project at cutting height from the disc face of the cutter.

As the gathered signatures advance beyond the cutting mechanism which trims and pattern roughens the backbone, adhesive primer is applied. One advantage of the present invention, however, is that the primer is not necessary and can be eliminated when the signatures are notched as shown in Figure VI. Priming is usually used when the signatures are cut smooth with no or very shallow notches. The primer when it is used may be applied as a low viscosity liquid organic solvent solution of a synthetic resin adhesive composition, as a fluid aqueous dispersion of a synthetic polymer adhesive or as a low viscosity, solvent-free, hot-melt synthetic resin adhesive composition. The primer is applied with a cylindrical applicator roll which rotates partially immersed in the adhesive bath and transfers primer to the backbone carrying a pattern of transverse grooves which are potential wells for adhesive.

The applicator roll may be equipped with means for metering the amount of adhesive applied and more than one applicator operating in series may be used. A series of thermostatically heated cylinders may complement the applicator rolls to provide a means of partially drying the primer which is capable of drying by volatile loss.

The primer wells into the transverse grooves from where it is partially adsorbed between the pages in a minute functional quantity at the base and at the walls of the groove as well as at the ridge surface between the grooves. The net effect of the pattern roughening of the backbone is to increase the backbone area exposed to adhesive contact.

The primed backbone is then subject to application of adhesive which preferably is a solvent-free, hot-melt, thermoplastic synthetic organic resin adhesive composition. The adhesive may be applied as a single coat or as a plurality of coats. The applicator roll may have means of metering the hot melt and may be complemented with a series of thermostatically heated rolls which either retard the cooling of the applied hot melt or provide a means of reheating the adhesive to a more plastic state for subsequent operations such as attachment of the cover.

The clamped pages now constituting a single volume with a backbone adhesively bound with a glue-line substantially greater than the length of the book is then advanced to the covering operation where the cover is applied and broken to conform with the adhesively bound backbone dimensions.

The resulting volume has increased strength at the binding edge and exhibits improved quality of cover application. The precisely machined ridges between the transverse grooves have their surface precisely parallel to the surface of the cover applicator and cover breaker resulting in uniform application of pressure to the cover in conforming to the dimensions of the book. There is no deformation of the backbone and consequently adhesion of the cover is uniform and neat.

The use of precision cutting mechanisms of this invention in the art of binding books at high speed, such as 150 books per minute now possible with the use of solvent-free, hot-melt synthetic resin adhesives, represents a significant advance in the art. The reciprocating cutters and the rotary cutters of the prior art are incapable of precision trimming and trimming at the high speeds now permissible in the binding operations involving the use of quick-setting hot-melt adhesives without the mechanical support of staples or stitches.

The design of the book back-up plate is an important part of this invention and is a considerable advance over the prior art. Earlier art devices give only partial support to the exposed binding edge leaving the portion designated to be trimmed or grooved unsupported. The backing plate of this invention fully supports the exposed binding edge and extends beyond it. The durable cutting bits of the cutting head are capable of easily grooving the dispensible rim edge of the backing plate as well as the paper of the book. The die edge is renewable by manually advancing the rim edge in tangential contact. This support is essential to precision cutting since it prevents flaring and consequential roughness of pattern and deviation from the square which results from inadequate support. The advantages of "notch-binding" and "pattern roughing" in improving the backbone hinge of the book is well known to the art. The device of this invention produces further improvement through its rapid precision machining of the backbone which provides an accurately squared increased glue-line for substantially uniform acceptance of adhesive. More uniform distribution of the adhesive and the squared backbone provides better cover contact and better adhesion in the covering operations.

The device of this invention is multifunctional in that the primary cutter replaces the less accurate trimming knife of earlier machines and the secondary cutter performs the roughing and grooving in accurate pattern which is easily altered by change in the height of the cutting teeth and the segmentary arrangement of said teeth equidistant from the axis of rotation. The simplicity of design permits replacement and alteration with a minimum of operation shutdown.

Important advantages are, a combination of minimum of friction on the passing book with maximum support at the cutting point and with ability to renew the support readily at will, thus providing an accurate, close tolerance between the back support and the cutting edge or edges of the teeth.

The sharp smooth cut edges produced by the present invention accomplish a new result when hot melt adhesives are applied directly to the cut signatures. When the pages are not cut sharply, they are frayed and fractured close to their edges. When the hot melt adhesive is applied it holds only the extreme edge of the page, i. e., it does not travel into the sheet by wicking. Subsequently, when the page is pulled away from the adhesive, the sheet breaks at the fracture near the glue line. On the other hand, if the cut is clean, without fracture, the page either pulls away from the adhesive or breaks somewhere up the page.

The hot melt adhesives disclosed in copending applications to Evans et al., S. N. 131,908, and Pinkney, S. N. 131,900 are particularly useful in this invention and have a glue line strength substantially equal to, or greater than, the tensile strength of the paper.

It is apparent that many widely different embodiments of this invention may be made without departing from the spirit and scope thereof, and therefore, it is not intended to be limited except as indicated in the appended claims.

I claim:

1. An apparatus for pattern trimming clamped signatures of a book which comprises a rotatable disc-like base provided with cutting teeth which project upwardly from the said base and being disposed at spaced intervals near the periphery of the base and having their cutting edges on the side of the tooth nearest the periphery of the base, means for rotating the base in a substantially horizontal plane below the lower edge of the signatures to be trimmed, a disc-like backing plate which is stationary in operation and which is provided with a sharp cutting edge defined by a terminal end of a cut-away portion of a depending flange positioned against the entire depth of one side of the signatures exposed below the clamping means, the said sharp edge being substantially vertical and along the point of tangency between the disc-like backing plate and the signatures, and having substantially the identical contour as the cutting edge of the said teeth, means for passing clamped signatures across the path of the cutting teeth in contact with the backing plate at its cutting edge, whereby a portion of the exposed edges of the signatures is cut by a shearing action.

2. The apparatus of claim 1 in which means are provided for rotatably advancing the edge of the cut-away portion towards the cutting teeth to compensate for wear by creating a new cut-away edge against which the teeth can operate.

3. The apparatus of claim 1 in which the flange of the backing plate is brass and in detachably mounted to the said disc-like base.

4. The apparatus of claim 1 in which the cutting head on which the teeth are mounted is tilted at an angle such that the teeth on the trailing side are depressed just sufficiently to clear the trimmed signatures.

5. The apparatus of claim 1 in which the cutting head is reciprocally mounted whereby the cutting teeth may be reciprocated into and out of contact with the signatures.

6. The apparatus of claim 1 in which the cutting head is provided with teeth on only approximately half of its circumference.

7. The apparatus of claim 1 in which the said flange is approximately square in cross-section and approximately the width of the exposed section of the signatures below the clamp.

8. The apparatus of claim 7 in which the depending flange is an incomplete ring at least one terminal end of which forms a sharp cutting edge in tangential relation to the path of the cutting edge of the teeth.

9. In an apparatus for continuously binding books, the combination of a travelling chain provided with clamps adapted to hold the signatures to be bound vertically therebetween, means for passing the clamped signatures at a high rate of speed over a cutting device which pattern trims the lower ends of the signatures exposed below the clamps, the said cutting device comprising a rotatable disc disposed in a substantially horizontal plane, cutting teeth projecting upwardly from the face of the said disc near its periphery in arced segments equidistant from the axis of rotation, the cutting teeth in at least one segment projecting at a greater height than the teeth in an adjacent segment and having substantially vertical cutting edges on their sides nearest the said periphery, means for rotating the toothed disc, a disc-like backing plate which is stationary in operation having a depending flange positioned against the signatures and covering their entire depth exposed below the clamps, a substantially vertical cutting edge defined by a cut out portion of the said flange at the point of tangency between the disc-like backing plate and the signatures, and having the same contour as the said vertical edges of the cutting teeth, and means for passing the clamped, vertically disposed signatures between the teeth of the rotatable cutter and the said cutting edge of the backing plate.

10. The apparatus of claim 9 in which the means for rotating the toothed disc is a motorized spindle disposed in a position tilted slightly from the vertical such that the trailing teeth of the said toothed disc are depressed sufficiently to be out of contact with the trimmed signatures.

11. The apparatus of claim 9 in which the cutting device is reciprocally mounted to move the cutting teeth in to and out of contact with the signatures.

12. The apparatus of claim 1 in which the cutting teeth project upwardly at uniform height and at equally spaced intervals equidistant from the axis of rotation.

ROBERT E. FOGG.

References Cited in the file of this patent
UNITED STATES PATENTS

| Number | Name | Date |
| --- | --- | --- |
| 276,296 | Smyth | Apr. 24, 1883 |
| 1,047,493 | Bryant | Dec. 17, 1912 |
| 1,248,253 | Bredenberg | Nov. 27, 1917 |
| 1,280,753 | Juengst | Oct. 8, 1918 |
| 1,394,309 | Juengst | Oct. 18, 1921 |
| 1,642,866 | Ackley | Sept. 20, 1927 |
| 1,804,392 | Alger | May 12, 1931 |
| 1,835,685 | Ackley | Dec. 8, 1931 |
| 1,988,208 | Martin | Jan. 15, 1935 |